United States Patent [19]
Kliman et al.

[11] Patent Number: 4,927,329
[45] Date of Patent: May 22, 1990

[54] AIRCRAFT ENGINE UNDUCTED FAN BLADE PITCH CONTROL SYSTEM

[75] Inventors: Gerald B. Kliman, Schenectady; Donald W. Jones, Burnt Hills, both of N.Y.

[73] Assignee: General Electric Company, Schenectady, N.Y.

[21] Appl. No.: 260,645

[22] Filed: Oct. 21, 1988

[51] Int. Cl.$^5$ .............................................. B64C 11/44
[52] U.S. Cl. .................................. 416/127; 416/155; 416/129
[58] Field of Search ............... 416/155, 127, 129, 130, 416/171, 157 B

[56] References Cited

U.S. PATENT DOCUMENTS

| | | | |
|---|---|---|---|
| 2,488,392 | 11/1949 | Forsyth | 416/155 X |
| 2,491,172 | 12/1949 | Forsyth | 416/155 |
| 2,533,346 | 12/1950 | Brady et al. | 416/127 |
| 2,612,228 | 9/1952 | Forsyth | 416/155 |
| 3,900,274 | 8/1975 | Johnston et al. | 416/155 |
| 4,147,945 | 4/1979 | Holz et al. | 310/115 |
| 4,242,864 | 1/1981 | Cornett et al. | 60/226 |
| 4,556,366 | 12/1985 | Sargisson et al. | 416/155 |
| 4,591,313 | 5/1986 | Miyatake et al. | 416/155 |
| 4,621,978 | 11/1986 | Stuart | 416/127 |
| 4,657,484 | 4/1987 | Wakeman et al. | 416/127 |
| 4,738,590 | 4/1988 | Butler | 416/129 |
| 4,738,591 | 4/1988 | Butler | 416/129 |
| 4,772,180 | 9/1988 | Walker et al. | 416/33 |

FOREIGN PATENT DOCUMENTS

3406634  8/1985  Fed. Rep. of Germany ...... 416/155

OTHER PUBLICATIONS

S. C. Peak et al., "A Study of System Losses in a Transistorized Inverter-Induction Motor Drive System", *IEEE Transactions on Industry Applications*, Jan./Feb. 1985, vol. IA-21, No. 1, pp. 248-258.

J. L. Oldenkamp et al., "Selection and Design of an Inverter-Driven Induction Motor for a Traction Drive System", *IEEE Transactions on Industry Applications*, Jan./Feb. 1985, vol. IA-21, No. 1, pp. 259-265.

*Primary Examiner*—Everette A. Powell, Jr.
*Attorney, Agent, or Firm*—Marvin Snyder; James C. Davis, Jr.

[57] ABSTRACT

An electric motor driven blade pitch varying system for the fan blades of an unducted fan type aircraft gas turbine engine utilizes permanent magnet alternating current motors located in the oil sump region of the engine. An alternator driven by the engine generates unregulated variable frequency, variable amplitude power which is rectified and placed on a DC bus. Controlled inverters convert the DC power on the bus to appropriate AC power for the motors. The system incorporates redundancy without significant weight penalty by providing alternators and motors dividing into two independent operating sections on common shafts. Separate electronic circuits are provided to supply power for each sectionalized motor or to rectify power from each alternator section. A common power bus may be used to couple the multiple motors and alternators. The common bus may alternatively receive power from tbe aircraft 400 Hz system or from on-board batteries.

19 Claims, 7 Drawing Sheets

AIRCRAFT ENGINE UNDUCTED FAN BLADE PITCH CONTROL SYSTEM

FIELD OF THE INVENTION

This invention relates generally to systems for varying or controlling the pitch of propulsor blades of aircraft gas turbine engines and, more particularly, to an electric motor driven control apparatus for varying the pitch of fan blades of an unducted fan type gas turbine engine.

BACKGROUND OF THE INVENTION

Gas turbine engines generally include a gas generator which comprises a compressor for compressing air flowing rearward through the engine, a combustor in which fuel is mixed with the compressed air and ignited to form a high energy gas stream, and a turbine driven by the gas stream and connected to drive a rotor which in turn drives the compressor. Many engines further include a second turbine, known as a power turbine, located aft of the gas generator for extracting energy from the gas stream to drive a rotating load with variable pitch blades such as found in the propulsor of helicopters, ducted turbo-fan engines, and turbo-prop engines.

A recent improvement over the turbo-fan and turbo-prop engines described above is the unducted fan engine such as is disclosed in U.K. Patent Application No. 2,129,502 published May 16, 1984. In the unducted fan engine, the power turbine includes counterrotating rotors and turbine blades which drive counterrotating unducted fan blades located radially outward of the power turbine section of the engine.

The fan blades of the unducted fan engine are variable pitch blades to achieve optimum performance of the engine and thrust reversal. During operation, fuel efficiency of the engine can be optimized by varying the pitch of the blade to correspond to specific operating conditions.

In general, the environment of the engine has required that the actuating mechanism for controlling blade pitch utilize hydraulic actuators driving various types of gear arrangements to position the fan blades at desired locations or pitch angles. An exemplary form of pitch drive mechanism is illustrated in Wakeman et al. U.S. Pat. No. 4,657,484, issued Apr. 14, 1987 and assigned to the instant assignee, wherein the pitch of the fan blades is varied by a hydraulic actuator mounted inside the static power turbine support structure. The motion commanded from the actuator is first transmitted to the rotating member by a system of bearings and then to the blades by a system of gears and linkages mounted on the rotating member. It is desirable, in this type of system, to accurately position the two rows of counterrotating blades so that the pitch of each respective one of the fan blades not only matches the required thrust at various speeds but also produces accurate synchronization of speed of the two blade rows such that blade crossings occur at a precise position with respect to each other and the aircraft structure. In general, such systems utilize blade pitch to control thrust which in turn affects the rotational speed of the blades such that any slight variation in pitch control alters the precise position at which the blade crossings occur. A more detailed discussion of the mechanism and control system for controlling operation of the engine and for achieving desired blade pitch angles for the blades of each of the rows can be had by reference to Walker et al. U.S. Pat. No. 4,772,180, issued Sept. 20, 1988 and assigned to the assignee of the present invention.

Prior art systems which have relied on hydraulic controls for accurately positioning blade pitch sometimes function less than optimally in achieving the precision and bandwidth necessary to perform all of the control functions simultaneously. Furthermore, it has not been practical to provide back-up or alternate sources of hydraulic power to support the pitch control mechanism in case of failure of the primary system. Such failure thus requires shut-down of the pitch control system and default to a fixed emergency condition. Still further, it is believed that the hydraulic system efficiency is typically rather low, and it is desirable to increase efficiency of such system in order to improve specific fuel consumption, reduce peak demand and reduce the thermal load of the engine.

Some advances have been made in hydraulic controls by utilizing rotating hydraulic motors to drive gear trains which ultimately change and hold blade pitch position. The hydraulic motors are proportionately controlled by a small electrically operated pilot valve controlling the main control valve for the hydraulics. In other constructions, a variable swash plate may be used in the hydraulic motor to replace or supplement the power valve. The swash plate may be operated by an electric or hydraulic proportional actuator. In either of these embodiments, a single hydraulic pump operating from the engine powers both of the hydraulic motors. It is not believed practical to extend the hydraulic system beyond the engine envelope to achieve power source redundancy and a second full system or hydraulic pump requires an unacceptable weight penalty.

Although there have been attempts to implement electric drive systems for controlling the pitch of aircraft propellers during the World War II era, there appears to be no such implementation suitable for present-day aircraft. In general, prior attempts have used individual direct current motors switched on and off by relays running from the aircraft direct current power bus. Once the fan blade is driven to a desired location, the blade is held in that position by mechanical means since precise electrical servo controls were not available to maintain the fan blade position. Thus, the electrical drive system was used solely to change position of the fan blades, but not to actually maintain the position of the fan blades. Such prior art systems, however, all appear to be unacceptable in the type of aircraft engine to which this application is directed, due to the required reliability, operation of the control from unregulated power, precision and bandwidth of the control, and location in the oil sump region inside the engine.

SUMMARY OF THE INVENTION

One object of the present invention is to provide an improved apparatus and system for controlling the pitch of propulsor blades in an unducted fan aircraft gas turbine engine which overcomes the above discussed disadvantages, or undesirable features, of the prior art.

Another object of the invention is to provide a control system for regulating blade pitch which is relatively light in weight, reliable, and operable from electrical power generated within the engine.

A further object of the invention is to provide an electrically powered blade pitch control system which includes redundant devices for improving reliability.

In one embodiment, propulsion means for a conveyance, such as an aircraft, comprises a gas turbine engine having a stationary member, and first and second rotating members coaxially disposed about the stationary member. An annular gas flow path coaxial with the first and second rotating members is intersected by a plurality of first and second rotor blades attached to the first and second rotating members, respectively, which extend into the flow paths such that the gas stream through the flow path causes the first and second rotating members to counterrotate. A plurality of forward and aft variable pitch propulsor blades are coupled to, and disposed radially outward of, the first and second rotating members. Operation of gear means coupled to the propulsor blades allows the pitch angle of the propulsor blades to be varied. Electric motor means are connected to the stationary member and include a rotor driving a shaft coupled to the gear means such that rotation of the motor shaft effects a pitch change of the propulsor blades. The gas turbine engine generates the gas stream, and includes a rotating compressor shaft. Alternator means are coupled to the compressor shaft for generating variable frequency, variable voltage, unregulated alternating current power. A rectifier connected to the alternator means converts the alternating current power to direct current power and an inverter connected for receiving the direct current power converts the direct current power to controlled frequency, controlled amplitude alternating current power. The output of the converter selectively supplies the controlled alternating current power to the motor.

Control means responsive to a desired propulsor pitch command controls the inverter means for driving the blades to a desired pitch. In one arrangement, two electric motors are provided, each connected through corresponding gears to drive a gear mechanism, respectively, which is in driving relationship with a corresponding respective one of the forward and aft propulsor blades. The inverter includes two inverter sections connected, respectively, to the first and second motors, and the control means controls each of the inverter for independently positioning each respective forward and aft set of propulsor blades. For redundancy, additional electric motors may be coupled to each of the first and second gear mechanisms, respectively, with each of the additional electric motors being powered by corresponding inverters coupled to the common power bus. The redundant system may also include dual alternators connected to the compressor drive shaft with dual rectifiers connected respectively to each of the alternators for supplying power from a corresponding alternator to the common power bus. In still another arrangement, the common power bus may be coupled to the aircraft electrical power system whereby the aircraft may supply electrical power to the power bus upon failure of the alternator. In this system, the engines of the aircraft may be connected to the common power bus so that failure of the alternator system in one engine can be overcome by drawing power from the alternator system of another engine.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
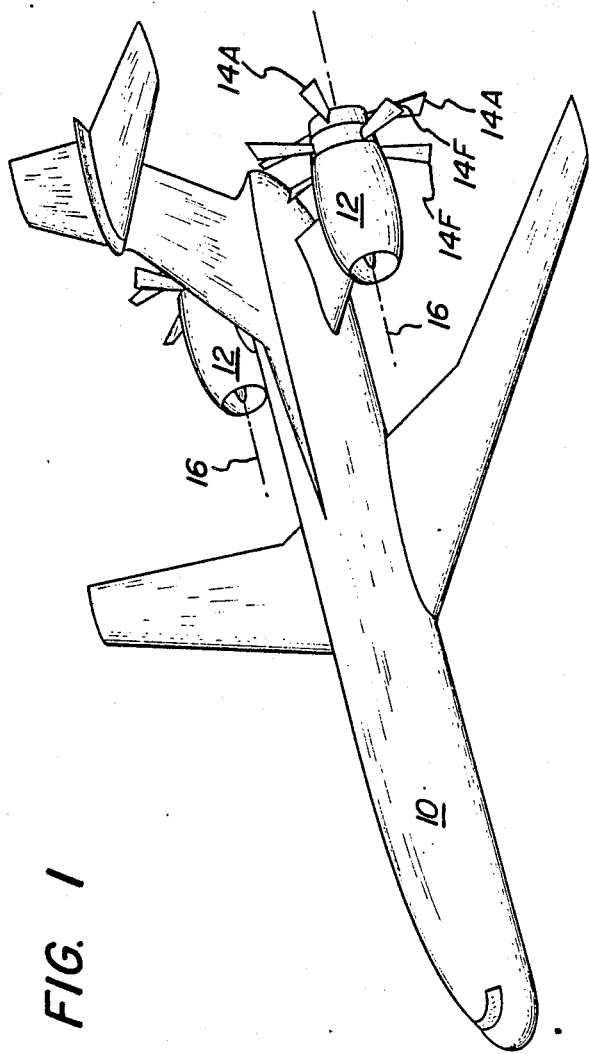
FIG. 1 illustrates an aircraft having gas turbine engines with counterrotating fore and aft propellers.

FIG. 1 illustrates an aircraft 10 having engines 12 of the gas turbine type mounted on the airframe near the tail end thereof. Engines 12 each drive a fore propulsor 14F and an aft propulsor 14A which rotate in opposite directions about a propeller axis 16.

Figure 2:
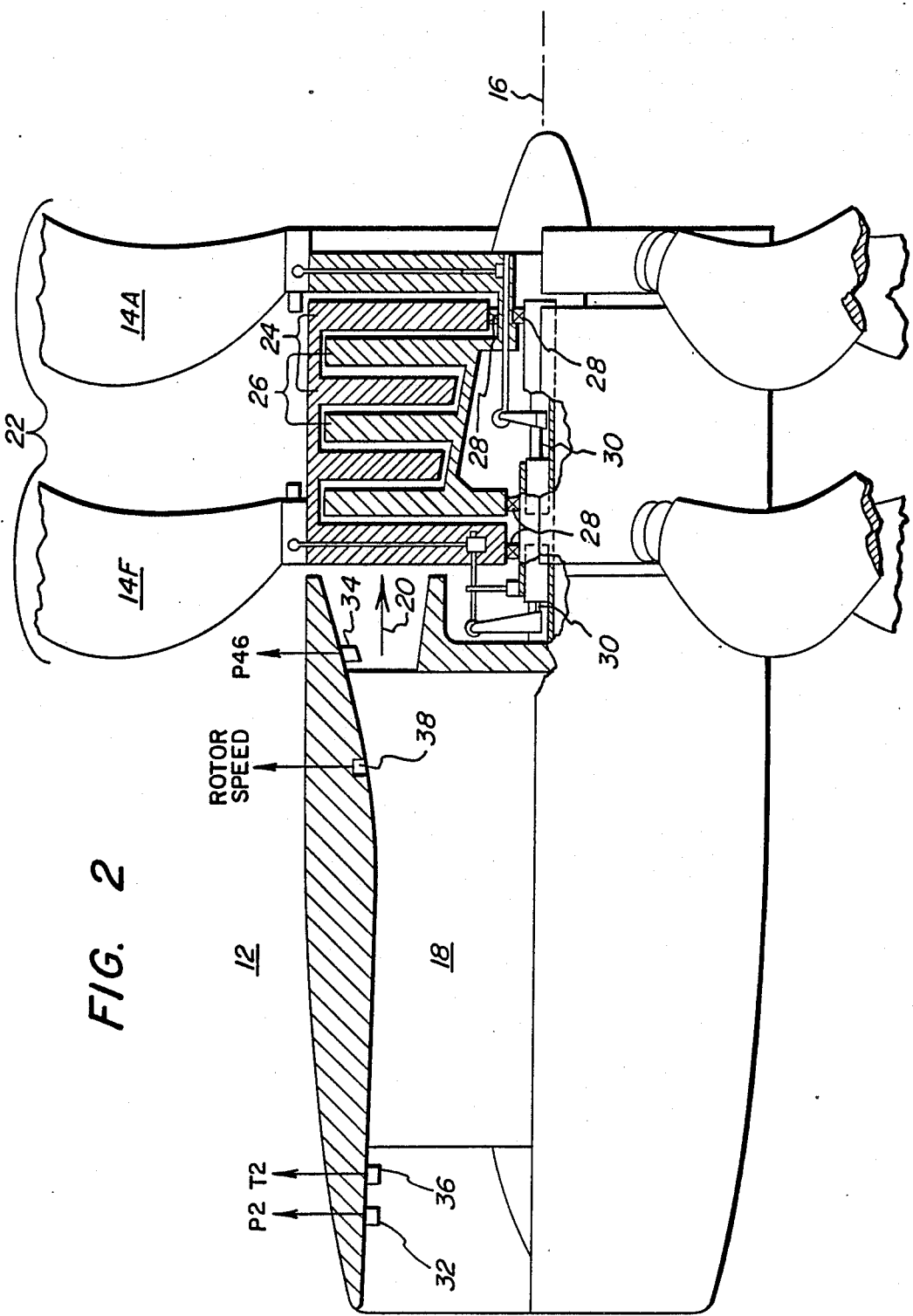
FIG. 2 is a simplified and partially cut-away cross-sectional view of one of the aircraft engines of FIG. 1 with a hydraulic pitch control mechanism, coupled to propulsor means driven by the engine.

FIG. 2 illustrates in greater detail the engine propulsor system 12 of FIG. 1 which employs hydraulic actuators for pitch change. Ahead (or forward) of propulsors 14A and 14F is gas turbine 18 such as type F404 manufactured by the assignee of the present invention. The gas turbine drives a shaft (not shown) and also can be considered to be a gas generator since it generates a high energy gas stream, represented by an arrow 20, that is supplied to a propulsor stage 22.

Propulsor stage 22 extracts energy from the gas stream directly by means of low-speed counterrotating power turbine blade sets. This technique obviates any need for using a high speed turbine, thereby avoiding any need for employing a speed reduction gearbox in order to drive the propulsor. A first set of blades 24 extracts energy from the gas stream indicated by arrow 20 and spins the forward propulsor 14F in one direction. A second set of blades 26 also extracts energy from the gas stream but spins the aft propulsor 14A in the opposite direction. Bearings 28 support the blade sets and propulsors and allow this counterrotation.

A pitch-change mechanism 30 for changing pitch of propulsors 14A and 14F is shown schematically. It is desirable to control pitch-change mechanism 30 so that the propulsor pitch is proper under the prevailing operating conditions of the aircraft.

Various monitors are located in gas turbine 18 including sensors 32, 34 which provide signals representative of gas pressure (p2, P46) and sensor 36 which provides signals representative of inlet air temperature (T2). Signal P2 (inlet air pressure) and signal P46 (air pressure exiting gas generator 18) are used to develop engine pressure ratio (EPR). While EPR is known to be the ratio P46/P2, it will be appreciated that if P2 is held constant, EPR can be obtained directly from a measurement of P46. Rotor speed is also sensed by a monitor 38 and provided as a control signal from gas turbine 18. These sensors and others not shown are well known in the engine art. One control system for a gas turbine such as gas generator 18 is described in Cornett et al. U.S. Pat. No. 4,242,864, issued Jan. 6, 1981, the disclosure of which is hereby incorporated by reference.

It is essential to provide sufficient energy to the gas stream to effect rotation of propulsors 14A and 14F at the speed and selected pitch angle that satisfies flight requirements or, more specifically, to meet a pilot's demand for engine thrust. An example of aircraft propulsor control for a propulsor driven by a gas turbine engine is presented in the aforementioned, commonly assigned U.S. Pat. No. 4,772,180 issued Sept. 20, 1988, the disclosure of which is hereby incorporated by reference.

Figure 3:
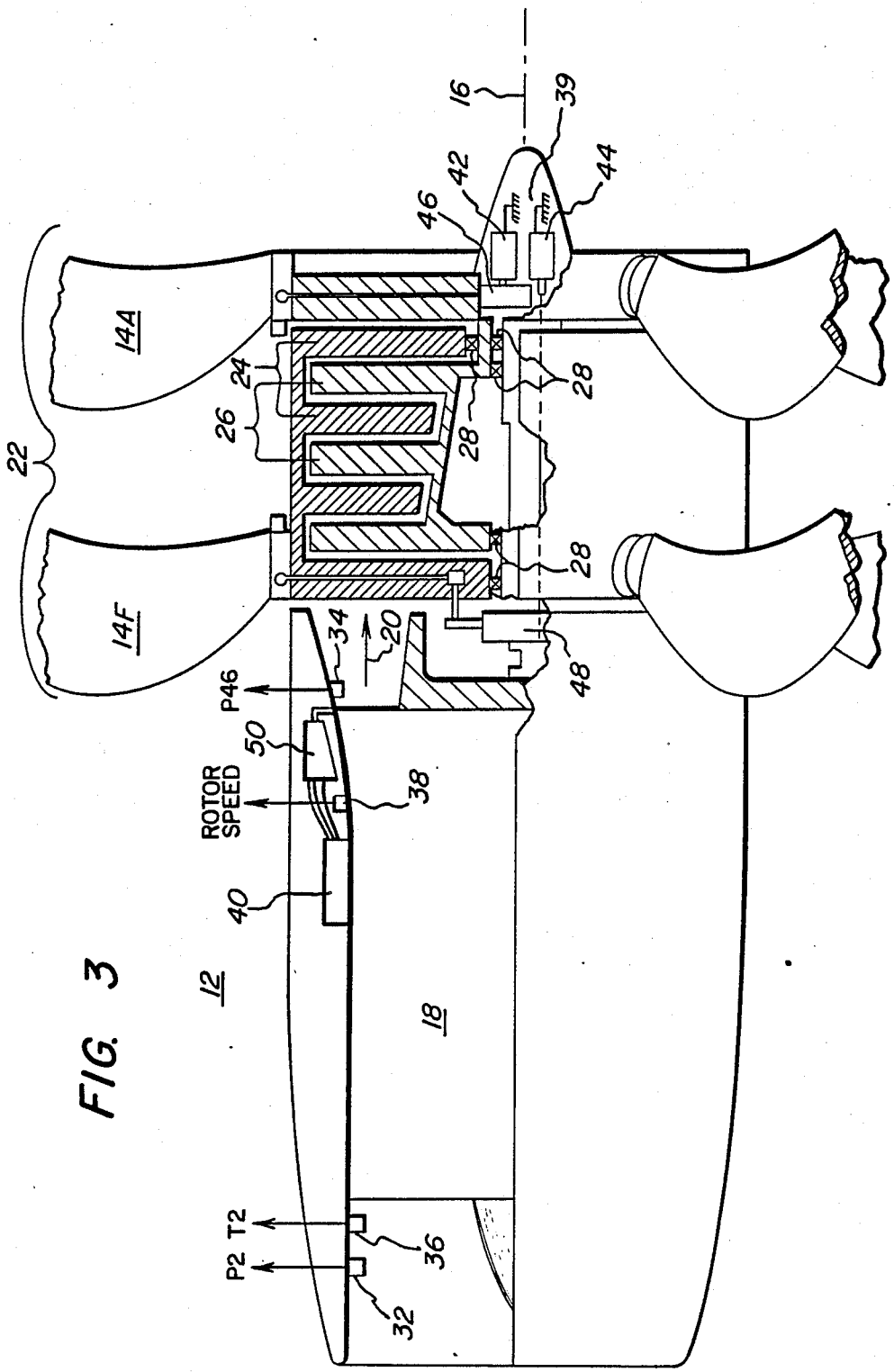
FIG. 3 is a simplified and partially cut-away cross-sectional view of one of the aircraft engines of FIG. 1 with an electrically-operated pitch control mechanism, in accordance with the present invention, coupled to propulsor means driven by the engine.

FIG. 3 is a drawing which generally corresponds to the system shown in FIG. 2, an important exception, however, being that the hydraulic actuators have been replaced by electrically-operated actuators. In the system of FIG. 3, an alternator 40 is positioned in the gas generator adjacent the compressor stage (not shown) and is driven by a driven shaft (not shown) in gas generator 18 coupled to the compressor for producing variable frequency, variable amplitude, unregulated alternating current (AC). At the rear of power turbine blades 24 and 26, in what is commonly referred to as a sump 39, there are positioned two electric motors 42 and 44. The sump rotates about axis 16. Motors 42 and 44 are fixedly mounted so as not to rotate with the sump and are preferably alternating current electric motors since the sump, which contains lubricating oil on its interior surface surrounding a core of oil vapor, does not present a hospitable environment to direct current or DC motors which require brushes and commutators and inherently generate sparks during commutation. Each of motors 42 and 44 is mechanically coupled to a corresponding gear box 46 and 48, respectively, which is in turn coupled to the mechanism controlling the pitch of propulsors 14A and 14F, respectively. The motors are stationary with respect to the rotating propulsors. Gear boxes 46 and 48 each provide a mechanical advantage sufficient to prevent forces on the propulsor blades, due to air flow impinging thereon, from repositioning motors 42 and 44, respectively. Power from alternator 40 is supplied through a rectifier and inverter stage 50 to motors 42 and 44.

Figure 4:
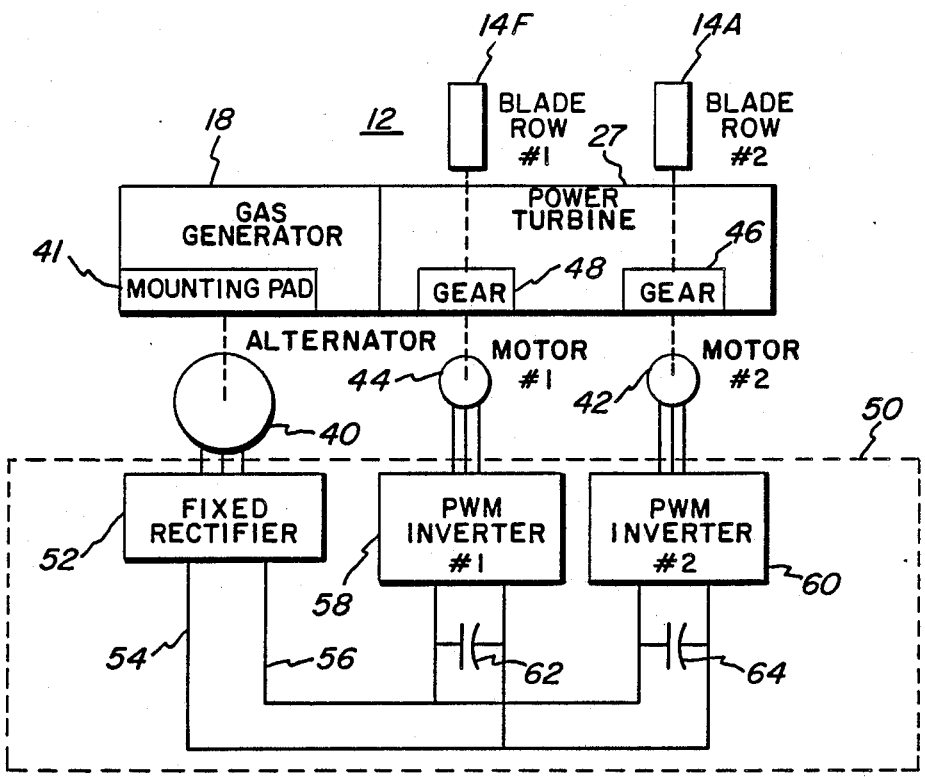
FIG. 4 is a simplified schematic/block diagram of one embodiment of an electrically-operated pitch control system employed in conjunction with a gas turbine engine according to the present invention.

FIG. 4 is a schematic representation of the present invention as applied to the gas turbine engine illustrated in FIG. 3. Alternator 40 is coupled through gearing or other appropriate power take-off devices at a mounting pad 41 to gas generator 18. It will be appreciated that the driven shaft of the gas generator is turning at a much lower rate than is normally desired to rotate the alternator and therefore apparatus 41 is utilized to increase the rotational speed of the alternator. Various means are known for coupling alternators to the gas generator and such coupling will not be discussed herein. A power turbine 27, which comprises power turbine blades 24 and 26, shown in FIG. 3, is driven by gas generator 18. Each of motors 42 and 44 is connected through appropriate gearing arrangements 46 and 48, respectively, to control pitch of the respective one of rotating blade rows 14A and 14F. Each of motors 42 and 44 includes a rotatable rotor mounted on a driven shaft which, in turn, drives the respective one of gear means 46 and 48. For simplicity of illustration, the shafts of alternator 40 and motors 42 and 44, and the couplings to blade rows 14A and 14F, are indicated by dashed lines extending to their associated gear arrangements.

The frequency and amplitude of the variable frequency, variable amplitude alternating current generated by alternator 40 are dependent upon the rotational speed of the compressor (not shown) within gas generator 18. In order to control motors 42 and 44 with power from alternator 40, it is necessary first to convert the variable characteristics of the power to at least a fixed frequency power. A rectifier inverter system 50 provided for this purpose includes a fixed rectifier 52 electrically connected to alternator 40 for converting the AC power to DC power and coupling that power to a power bus indicated by lines 54 and 56. The DC power on the power bus is supplied to first and second inverters 58 and 60, respectively, which operate to apply AC power of desired characteristics to motors 44 and 42, respectively. Preferably, inverters 58 and 60 comprise pulse width modulated (PWM) inverters of a type well known in the art and described, for example, in S.C. Peak et al., "A Study of System Losses In A Transistorized Inverter-Induction Motor Drive System", *IEEE Transactions On Industry Applications*, Jan/Feb 1985, Vol. IA-21, No. 1, pp. 248–258 and J. L. Oldenkamp et al., "Selection and Design Of An Inverter-Driven Induction Motor For A Traction Drive System", *IEEE Transactions On Industry Applications*, Jan/Feb 1985, Vol. IA-21, No. 1, pp. 259–265. Capacitors 62 and 64 are typically connected across the DC power bus at the input of the PWM inverters 58 and 60, respectively, to minimize line current fluctuations. The frequency variation in power supplied by alternator 40 is compensated for by fixed rectifier 52. The voltage variation in the power supplied from the rectifier is accommodated by pulse width modulation in the individual inverters 58 and 60.

In the system illustrated in FIG. 4, a single alternator is utilized to supply electrical power to each of a pair of motors 42 and 44 which control the pitch angles of propulsor blades in each of the fan blade rows, respectively. It is desirable that motors 42 and 44 be permanent magnet AC motors in order to achieve high efficiency without excessive weight. The permanent magnet motor, having independent flux excitation, is desirable in the event power is lost from the inverter circuit, since power may then be extracted from the rotation of the blade system to change the blade pitch angles so as to move the blades into the feathered position at an emergency default. While induction or switched reluctance motors may be used in a similar arrangement, such motors require a fully operational inverter for default performance in case of inverter power loss. Hence the system of FIG. 4, when utilizing permanent magnet AC motors, achieves the benefits of high efficiency, wide bandwidth and high peak demand capability.

It may be noted that since the fuel for the engine is also circulated to perform an engine cooling function, the system of FIG. 4 brings about a reduction in cooling load on the fuel system since the system efficiency is high and delivers power only on demand. In addition, the alternator steady state losses are low enough to require only ram air cooling, obviating the need for liquid coolants and heat exchangers. Motors 42 and 44 do not require a separate cooling system as their losses are relatively low and their location is such that lubricating oil normally entering the sump may be used safely for both lubrication and cooling.

Figure 5:
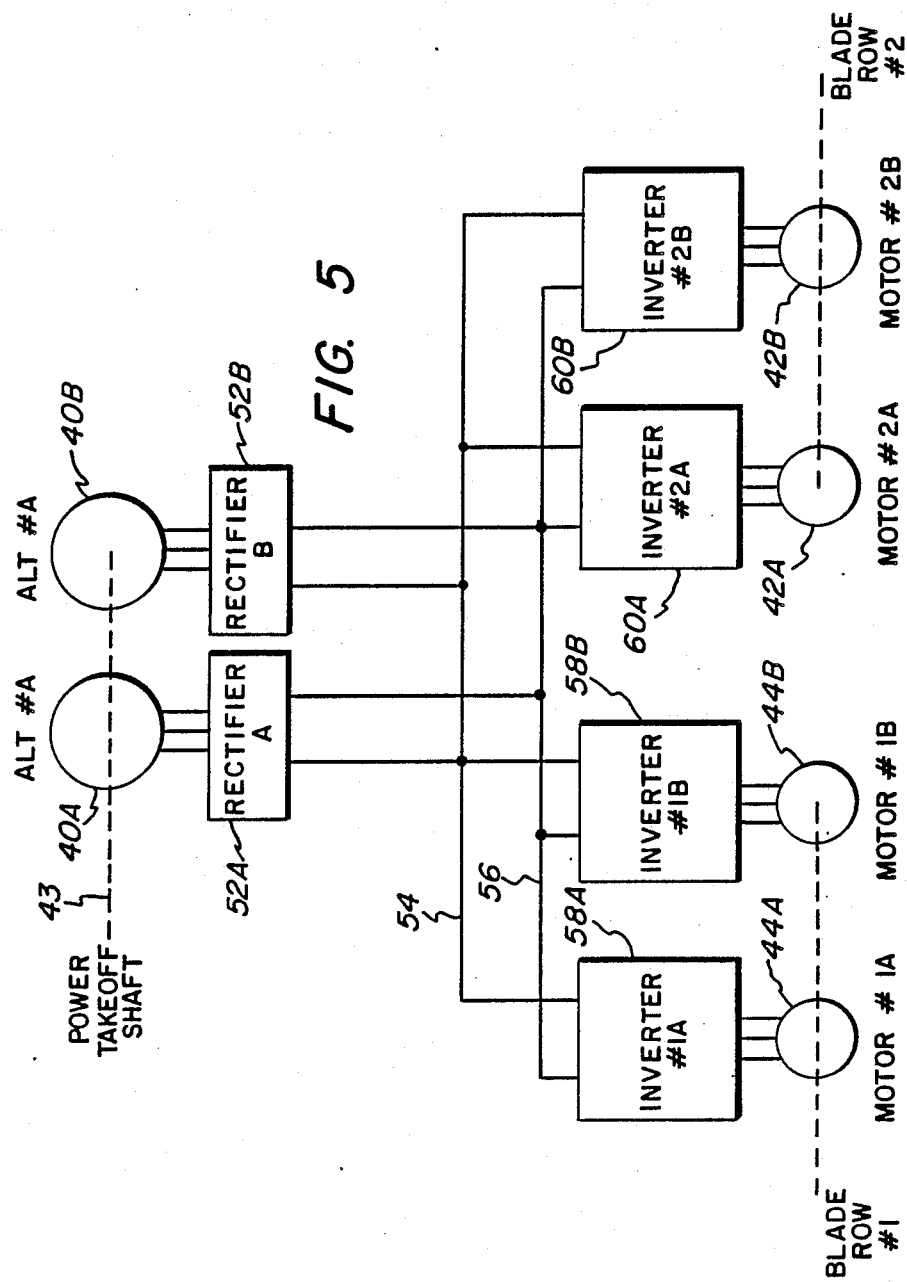
FIG. 5 is a simplified schematic/block diagram of another embodiment of an electrically-operated pitch control system employed in conjunction with a gas turbine engine according to the present invention.

FIG. 5 shows a modification of the system of FIG. 4 in which redundancy is added in order to protect against loss of blade pitch control in the event one component of the system should fail. Instead of one alternator, the system of FIG. 5 employs two independent alternators 40A and 40B connected to a common power take-off shaft 43 although, as an alternative, the alternators may be connected to independent shafts from gas generator 18 (shown in FIG. 4). Each of alternators 40A and 40B is connected to a separate fixed rectifier circuit 52A and 52B, respectively, which in turn supply power from the alternators to the common DC bus illustrated by lines 54 and 56. Each of motors 42 and 44 is, in this embodiment, formed of separate motor sections 42A, 42B and 44A, 44B, respectively. The motor sections may be separate, independent motors, but preferably formed in common housings, with separated windings, and with rotors mounted on a common shaft. Each of motors 42A, 42B and 44A, 44B is powered from an independent PWM inverter 60A, 60B and 58A, 58B, respectively. Each of the inverters is connected to the common DC bus 54 and 56. Consequently, if any of the pitch change motors or inverters or one of the alternators or rectifiers fails, operation of the system may be continued at a safe level with the remaining components. In the preferred embodiment, where each motor is split into two sections mounted on a common shaft, the penalty for this redundancy is only about 15% added weight. This particular arrangement is ideal since the system is sized to peak overspeed emergency torque requirements, whereas normal operation of the aircraft requires less than half of the emergency peak. Still additional efficiency can be obtained by replacing fixed rectifiers 52A and 52B with controlled rectifiers so as to provide capability for removing power from half of the system while in normal operation where full torque is not required.

Figure 6:
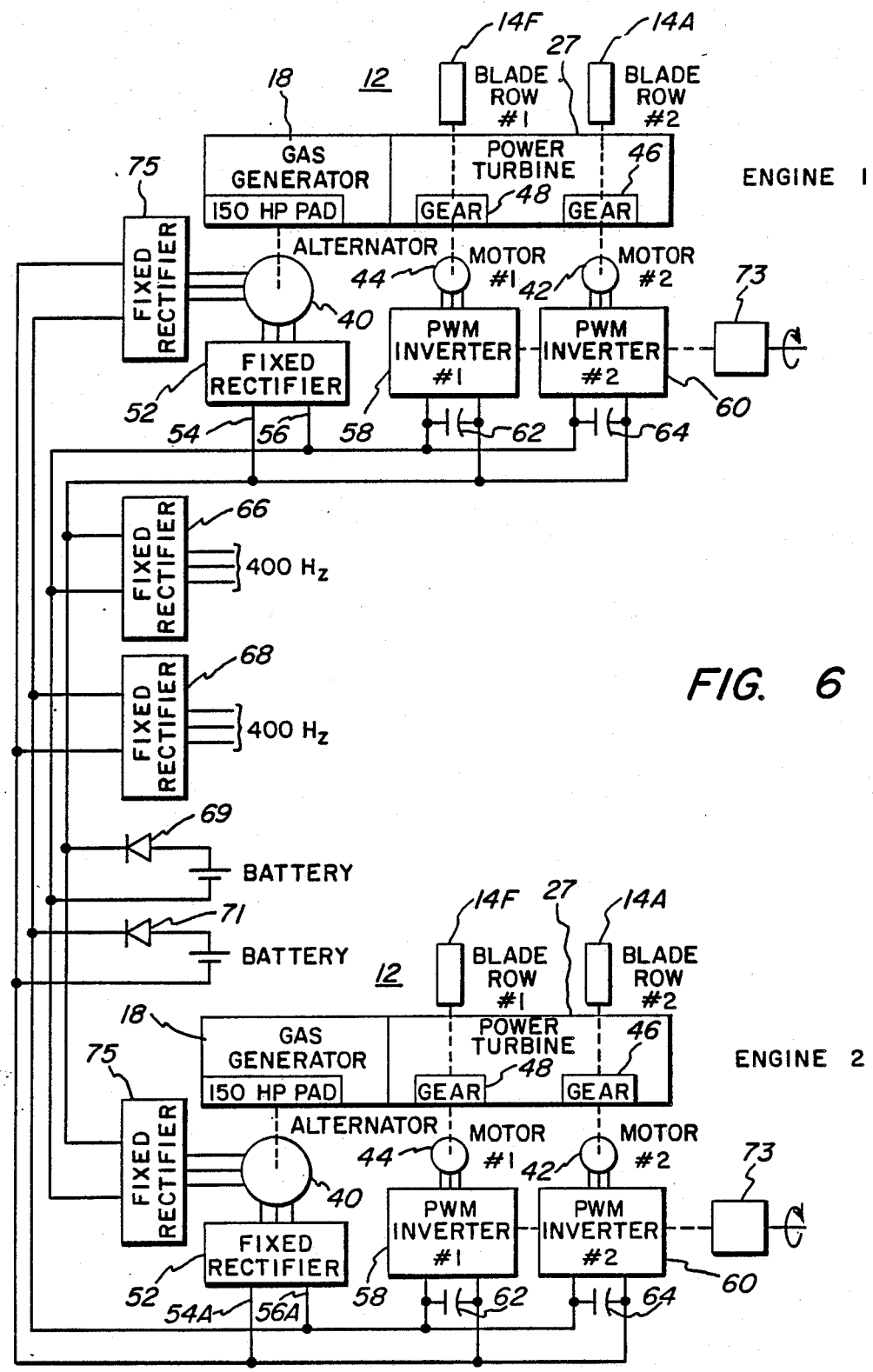
FIG. 6 is a simplified schematic/block diagram of still another embodiment of an electrically-operated pitch control system employed in conjunction with a gas turbine engine according to the present invention.

FIG. 6 illustrates a modification of the system of FIG. 5 which provides an alternate way of structuring a fault tolerant system to take advantage of a variety of power sources in an emergency. In this embodiment, the power sources from multiple engines of the aircraft are cross coupled so that the alternator of one engine can supply power not only to that one engine, but also to another of the engines through a fixed rectifier 75, when an alternator shaft or winding fails or if a rectifier 52 fails. Again, since normal load is approximately half the peak load, normal blade pitch control on both engines (assuming the aircraft has two engines) can thus be continued if one of the systems should fail. In addition, the aircraft power bus, which normally operates at 400 Hz, can be coupled into the common DC bus simply by rectifying the 400 Hz AC power. Still further, it may be desirable to connect the aircraft battery onto the system bus to supply emergency power for momentary demands. In particular, for a two-engine aircraft, engine 1 and its associated power system is connected to two power busses 54, 56 and 54A, 56A, respectively, and similarly, engine 2 and its associated power system is connected to the two busses. Each of the busses is also connected to the aircraft 400 Hz power system through corresponding rectifiers 66 and 68. Battery power is supplied to the busses through isolating diodes 69 and 71.

With appropriate gearing, the rotational motion of the propulsors may be utilized to drive motors 42 and 44 in a regenerative mode so as to derive power from the engine. In such arrangement, it may be desirable to provide a second small alternator 73 to generate low power for the inverter control circuitry to assure reliable operation in a regenerative mode or during system switching.

Figure 7:
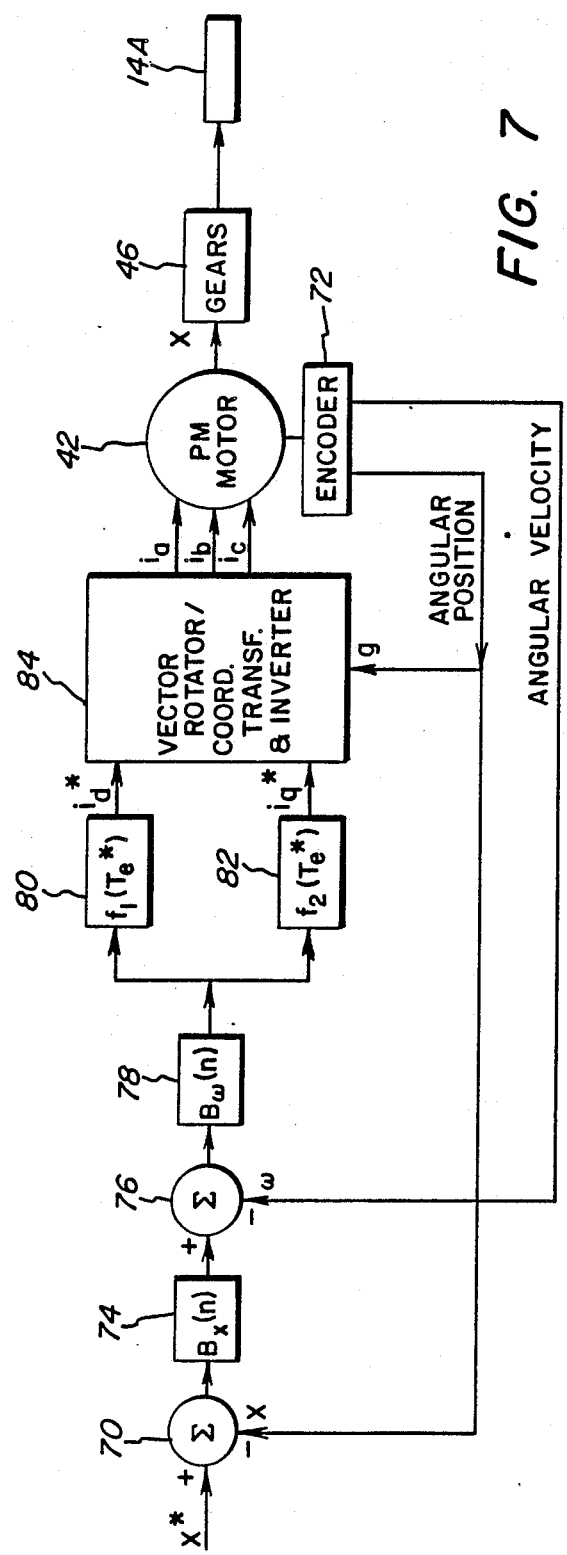
FIG. 7 is a block diagram of a control system for electric motors used in the embodiments shown in FIGS. 4-6.

FIG. 7 is a block diagram of a typical form of control system for controlling a motor 42 for positioning the blade pitch angle of blades of the aft blade row at desired positions. The position command X* derived from the control system or the engine specifies the desired pitch angle. Derivation of the desired pitch angle is set forth in the aforementioned U.S. Pat. No. 4,772,180. This command signal is applied to a summing node 70 where it is summed with a feedback signal X representative of actual blade position. The actual blade position is preferably derived from an encoder 72 coupled to the shaft of permanent magnet motor 42 which is preferably of the interior permanent magnet type. The difference between the desired position, and the actual position as derived from summing node 70, is applied to a compensation network 74 which converts the difference signal to an appropriate reference signal that can be compared against angular velocity in order to generate an appropriate torque command for the motor. This signal from compensation function circuit 74 is applied to another summing node 76 where it is summed against the actual speed of motor 42. The speed signal is also provided from encoder 72 and may comprise the derivative of the position signal. The signal derived from summing node 76 is applied to a torque command converter circuit 78 which converts that signal to an appropriate torque reference signal. The torque reference signal is applied to an armature current command converter 80 and a quadrature or flux command converter circuit 82. The armature current and flux command signals $i_d^*$ and $i_9^*$, respectively, derived from circuits 80 and 82, respectively, are applied to a vector rotator/coordinate transformer and inverter circuit 84 which develops corresponding three-phase alternating current levels for application to motor 42. The shaft of motor 42 is connected through gearing to control the pitch of aft blades 14A. A similar system may be employed to control the pitch of the blades in the forward row.

The foregoing describes an electrically powered control system for controlling the pitch of propulsor blades of a gas turbine engine, which system incorporates redundancy without a significant weight penalty. While the system has been described in what are presently considered to be preferred embodiments, other modifications and variations will become apparent to those having ordinary skill in the art. Accordingly, it is intended that the invention be interpreted within the spirit and scope of the appended claims.

What is claimed is:

1. Aircraft propulsion apparatus, comprising:
   (a) a gas generator for generating a gas stream and containing therein compressor means for driving a rotatable shaft;
   (b) first and second coaxially situated rotatable members;
   (c) a plurality of first and second rotor blades affixed to said first and second rotatable members, respectively, said first and second rotor blades being positioned such that a gas stream, when produced by said gas generator, impinges thereon and causes said first and said second rotatable members to counterrotate;
   (d) a plurality of forward and aft variable pitch propulsor blades coupled to, and extending radially outwardly of, said first and second rotatable members, respectively;

(e) gear means coupled to said propulsor blades;

(f) electric motor means, including rotor means, mounted in stationary fashion relative to said rotatable members;

(g) means coupling said rotor means to said gear means such that rotation of said rotor means effects a pitch change of said propulsor blades;

(h) electrical generator means coupled to said rotatable shaft for generating electrical power; and (i) circuit means coupling said electrical generator means to said motor means, said circuit means including control means responsive to a desired propulsor blade pitch command for controlling said motor means to force each of said blades to a respective desired blade pitch.

2. The aircraft propulsion apparatus of claim 1 wherein said electrical generator means comprises alternator means for generating variable frequency, variable voltage alternating current power, and wherein said circuit means comprises:

rectifier means coupled to said alternator means for converting said alternating current power to direct current power; and inverter means connected for receiving said direct current power and for converting said direct current power to controlled frequency, controlled amplitude alternating current power, said inverter means being coupled to selectively supply said controlled alternating current power to said motor means.

3. The aircraft propulsion apparatus of claim 2 wherein said motor means comprises first and second electric motors, said gear means includes a first geared mechanism coupled in driving relation between said first motor and said forward propulsor blades and a second geared mechanism coupled in driving relation between said second motor and said aft propulsor blades, and said inverter means includes first and second inverters coupled, respectively, to said first and second motors, said control means controlling each of said inverters for independently positioning each set of said forward and aft sets of propulsor blades, respectively.

4. The aircraft propulsion apparatus of claim 3 wherein each respective one of said motor means comprises a permanent magnet motor.

5. The aircraft propulsion apparatus of claim 3 including a common power bus interconnecting said rectifier means and said first and second inverters.

6. The aircraft propulsion apparatus of claim 5 wherein said alternator means comprises first and second alternators, and said rectifier means comprises first and second rectifiers for coupling said first and second alternators, respectively, to said common power bus.

7. The aircraft propulsion apparatus of claim 6 including third and fourth electric motors coupled respectively to each of said first and second geared mechanisms, each of said third and fourth motors being powered by corresponding inverters coupled to said common power bus.

8. The aircraft propulsion apparatus of claim 7 including battery means coupled to said power bus for providing power to said bus upon failure of said alternator means.

9. The aircraft propulsion apparatus of claim 8 wherein said gas generator is mounted to an aircraft so as to provide propulsive power thereto, said aircraft including an independent alternating current power system coupled to said common power bus through a corresponding rectifier means.

10. In a gas turbine engine, a rotatable structure, an annular gas flowpath extending coaxially with the rotatable structure, a plurality of rotor blades coupled to the rotatable structure and extending into the gas flowpath such that a gas stream through the flowpath causes the rotatable structure to rotate, and a plurality of variable pitch propulsor blades coupled to and disposed radially outward of the rotatable structure, control means for controlling blade pitch of said propulsor blades, said control means comprising:

(a) an alternator coupled in driven relationship with the engine for supplying variable frequency, variable amplitude electric power;

(b) an electric power bus;

(c) a rectifier interconnecting said alternator and said power bus, said rectifier converting said variable frequency, variable amplitude electric power to DC power on said bus;

(d) a first electric motor mounted in stationary fashion relative to said rotatable structure and having a driven shaft extending from said motor;

(e) an inverter coupling said motor to said power bus for converting said DC power to controllable amplitude AC power for driving said motor; and (f) gear means interconnecting said motor shaft and said propulsor blades for driving said propulsor blades to a selected pitch position upon energization of said motor.

11. The apparatus of claim 10 including:

a second electric motor connected in driving relationship with said first motor shaft; and a second inverter coupling said second motor to said power bus and converting said DC power to controllable amplitude AC power for driving said second motor.

12. The apparatus of claim 11 wherein said electric motors each comprise a part of a common electromagnetic machine mounted on said motor shaft.

13. The apparatus of claim 11 wherein each respective one of said electric motors comprises a permanent magnet machine.

14. The apparatus of claim 11 including:

a second alternator coupled in driven relationship with the engine; and a second rectifier interconnecting said second alternator and said power bus for supplying DC power on said bus.

15. The apparatus of claim 11 including:

third and fourth electric motors mounted in stationary fashion relative to said rotatable structure, each of said third and fourth motors having a rotatable rotor for driving a common shaft extending therefrom;

third and fourth inverters coupling said third and fourth motors, respectively, to said power bus and converting said DC power to controllable amplitude AC power for driving said third and fourth motors, respectively; and second gear means interconnecting said common shaft and said propulsor blades.

16. In a propulsion system for an aircraft, first and second engines mounted to said aircraft, each of said engines, respectively, including a rotatable structure, an annular gas flowpath extending coaxially with said rotatable structure, a plurality of rotor blades coupled to said rotatable structure and extending into said gas flowpath such that a gas stream through said flowpath causes said rotatable structure to rotate, and a plurality of variable pitch propulsor blades coupled to and disposed radially outward of said rotatable structure, control means for controlling blade pitch of the propulsor blades driven by said first and second engines, said control means comprising:

(a) first and second alternators coupled in driven relationship with said first and second engines for supplying variable frequency, variable amplitude electric power;

(b) first and second electric power busses;

(c) first and second rectifiers interconnecting said first and second alternators, respectively, and said first power bus, said first and second rectifiers, respectively, converting the variable frequency, variable amplitude electric power from said first and second alternators, respectively, to DC power on said first bus;

(d) third and fourth rectifiers interconnecting said first and second alternators, respectively, and said second power bus, said third and fourth rectifiers, respectively, converting the variable frequency, variable amplitude electric power from said first and second alternators, respectively, to DC power on said second bus;

(e) first and second electric motors mounted in stationary fashion relative to said rotatable structure of said first engine, each of said first and second motors, respectively, having a rotatable shaft extending therefrom, respectively;

(f) third and fourth electric motors mounted in stationary fashion relative to said rotatable structure of said second engine, each of said third and fourth motors, respectively, having a rotatable shaft extending therefrom, respectively;

(g) first and second inverters coupling said first and second motors, respectively, to said first power bus for converting DC power on said first bus to controllable amplitude AC power for driving said first and second motors, respectively;

(h) third and fourth inverters coupling said third and fourth motors, respectively, to said second power bus for converting DC power on said second bus to controllable amplitude AC power for driving said third and fourth motors, respectively;

(i) first and second gear means interconnecting the shafts extending from said first and second motors, respectively, and said first plurality of propulsor blades for driving propulsor blades of said first engine to selected pitch positions; and (j) third and fourth gear means interconnecting the shafts extending from said third and fourth motors, respectively, and said second plurality of propulsor blades for driving the propulsor blades of said second engine to selected pitch positions.

17. The apparatus of claim 16 including fifth and sixth rectifiers connected to said first and second electric power busses, respectively, each said fifth and sixth rectifiers being adapted to receive an external source of AC power, respectively.

18. The apparatus of claim 16 including first and second isolating diodes connected to said first and second electric power busses, respectively, and adapted to receive an external source of DC power, respectively.

19. The apparatus of claim 16 wherein each respective one of said first and second pluralities of variable pitch propulsor blades comprises a forward row of pitch propulsor blades and an aft row of pitch propulsor blades, said first and third gear means interconnecting the shafts extending from said first and third motors, respectively, to a row of forward pitch propulsor blades, respectively, and said second and fourth gear means interconnecting the shafts extending from said second and fourth motors, respectively, to a row of aft pitch propulsor blades, respectively.

* * * * *